(12) United States Patent
Ishii et al.

(10) Patent No.: US 10,341,331 B2
(45) Date of Patent: Jul. 2, 2019

(54) INFORMATION PROCESSING SYSTEM, INFORMATION PROCESSING APPARATUS AND FIRMWARE PROGRAM

(71) Applicant: BUFFALO INC., Nagoya (JP)

(72) Inventors: Suguru Ishii, Nagoya (JP); Tsukasa Ito, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 178 days.

(21) Appl. No.: 15/148,113

(22) Filed: May 6, 2016

(65) Prior Publication Data

US 2016/0330192 A1 Nov. 10, 2016

(30) Foreign Application Priority Data

May 7, 2015 (JP) .................................. 2015-095044

(51) Int. Cl.
G06F 7/04 (2006.01)
H04L 29/06 (2006.01)
G06F 21/57 (2013.01)
G06F 21/56 (2013.01)

(52) U.S. Cl.
CPC ............ *H04L 63/083* (2013.01); *G06F 21/56* (2013.01); *G06F 21/572* (2013.01)

(58) Field of Classification Search
CPC .......... G06F 21/31; G06F 21/64; G06F 21/51; G06F 21/57; G06F 12/1408; G06F 21/572; H04L 63/08
See application file for complete search history.

(56) References Cited

U.S. PATENT DOCUMENTS

| 6,385,727 | B1* | 5/2002 | Cassagnol | G06F 21/10 380/259 |
| 7,712,131 | B1* | 5/2010 | Lethe | G06F 21/57 701/29.1 |
| 7,930,458 | B2* | 4/2011 | Hutton | G06F 13/385 710/301 |
| 9,959,403 | B2* | 5/2018 | Sugahara | G06F 21/445 |
| 2003/0221114 | A1 | 11/2003 | Hino et al. | |
| 2005/0044363 | A1* | 2/2005 | Zimmer | G06F 21/572 713/170 |
| 2010/0082955 | A1* | 4/2010 | Chhabra | G06F 21/572 713/1 |
| 2015/0113266 | A1* | 4/2015 | Wooten | H04L 9/3234 713/156 |

FOREIGN PATENT DOCUMENTS

| JP | 2003-271254 A | 9/2003 |
| JP | 2011-004317 A | 1/2011 |
| JP | 2012-146338 A | 8/2012 |
| JP | 2012-216222 A | 11/2012 |
| JP | 2014-509421 | 4/2014 |
| WO | WO 02065258 A2 * | 8/2002 ........... G06F 21/445 |

OTHER PUBLICATIONS

Japan Office Action dated on Sep. 25, 2018 in Japanese Application No. 2015-095044 (with English translation), 9 pages.

* cited by examiner

*Primary Examiner* — Ali S Abyaneh
(74) *Attorney, Agent, or Firm* — Oblon, McClelland, Maier & Neustadt, L.L.P.

(57) ABSTRACT

An information processing apparatus includes circuitry that retains firmware and performs processing based on the firmware, receives a command from an external device, and transmits a predetermined response to the external device as processing of the firmware in a case where the received command is a predetermined authentication command.

16 Claims, 6 Drawing Sheets

INFORMATION PROCESSING SYSTEM, INFORMATION PROCESSING APPARATUS AND FIRMWARE PROGRAM

CROSS-REFERENCE TO RELATED APPLICATION

This application claims priority from Japanese Patent Application No. 2015-095044, filed on May 7, 2015, the entire subject matter of which is incorporated herein by reference.

FIELD

Aspects of the present disclosure relate to an information processing system, an information processing apparatus and a firmware program.

BACKGROUND

In recent years, many apparatuses such as personal computers, peripheral devices (including USB devices, wireless LAN access points and so on) for personal computers, mobile phones, and home appliances are controlled according to preset firmware by computers.

It is desired that these apparatuses can detect unauthorized rewriting of firmware.

For example, JP-A-2014-509421 discloses a technology for performing processing such as searching suspicious patterns from information such as device classes in order to cut off communication between suspicious USB devices and hosts.

SUMMARY

According to one aspect of the disclosure, there is provided an information processing apparatus, comprising circuitry configured to retain firmware and perform processing based on the firmware, receive a command from an external device, and transmit a predetermined response to the external device as processing of the firmware in a case where the received command is a predetermined authentication command.

BRIEF DESCRIPTION OF THE DRAWINGS

The above and other aspects of the present disclosure will become more apparent and more readily appreciated from the following description of embodiments of the present disclosure taken in conjunction with the attached drawings, in which.

DETAILED DESCRIPTION

Figure 1:
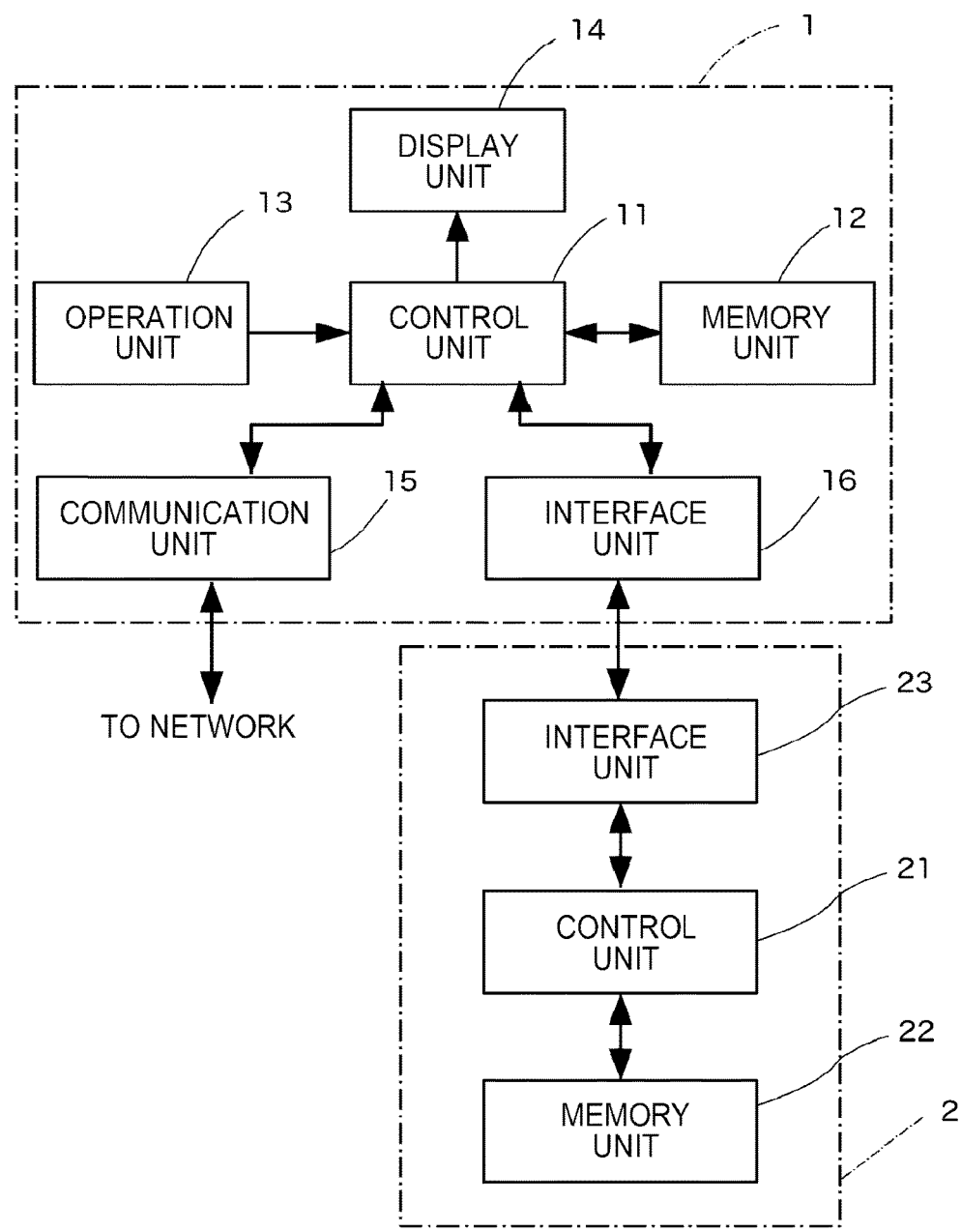
FIG. 1 is a block diagram illustrating an example of the configuration of an information processing system according to an embodiment of the present disclosure.

An embodiment of the present disclosure provides an information processing system, an information processing apparatus, and a firmware program capable of detecting unauthorized rewriting of firmware of an apparatus.

According to an embodiment of the present disclosure, there is provided an information processing system including: a first device; and a second device configured to retain firmware and perform processing based on the firmware, wherein: the second device includes: a second receiving unit configured to receive a command from the first device; and a second transmitting unit configured to transmit a predetermined response as processing of the firmware in a case where the received command is a predetermined authentication command, and the first device includes: a first transmitting unit configured to transmit the predetermined authentication command to the second device; a first receiving unit configured to receive a response to the predetermined authentication command from the second device; and a determining unit configured to determine whether the firmware of the second device is falsified based on whether the response received from the second device is the predetermined response and output the determination result.

According to another embodiment of the present disclosure, there is provided an information processing apparatus configured to retain firmware and perform processing based on the firmware. The apparatus includes: a receiving unit configured to receive a command from an external device; and a transmitting unit configured to transmit a predetermined response to the external device as processing of the firmware in a case where the received command is a predetermined authentication command.

According to a further embodiment of the present disclosure, there is provided a computer-readable non-transitory storage medium including a firmware updating program stored thereon, which can be executed by a computer of an information processing apparatus, the firmware updating program when executed by the computer, causing the information processing apparatus to: receive a command from an external device; and transmit a predetermined response to the external device as processing of the firmware in a case where the received command is a predetermined authentication command.

According to a further embodiment of the present disclosure, there is provided an information processing system including: a first device; and a second device configured to retain firmware and perform processing based on the firmware, wherein: the first device includes: a first transmitting unit configured to transmit a predetermined authentication command including an instruction for issuing authentication information, to the second device; and a first receiving unit configured to receive a response to the predetermined authentication command from the second device, the second device includes: a second receiving unit configured to receive a command from the first device; and a second transmitting unit configured to transmit first authentication information issued in the second device to the first device, as processing of the firmware, in a case where the received command is the predetermined authentication command; and a determining unit, the first receiving unit is further configured to receive the first authentication information, the first transmitting unit is further configured to transmit second authentication information generated based on the first authentication information to the second device, and in a case where the second receiving unit receives the second authentication information, the determining unit compares the first authentication information with the received second authentication information to determine whether updating of the firmware is permitted based on the comparison result.

According to the above-described configuration, it is possible to detect unauthorized rewriting of firmware of an apparatus.

An embodiment of the present disclosure will be described with reference to the accompanying drawings. As illustrated in FIG. 1, an information processing system according to an embodiment of the present disclosure includes a personal computer (PC) 1 which serves as a first device, and a USB device 2 which serves as a second device (an example of an information processing apparatus).

As illustrated in FIG. 1, the PC 1 includes a control unit 11, a memory unit 12, an operation unit 13, a display unit 14, a communication unit 15, and an interface 16. Also, the USB device 2 includes a control unit 21, a memory unit 22, and an interface 23.

The control unit 11 of the PC 1 is a program control device such as a CPU, and operates according to a program stored in the memory unit 12. The control unit 11 operates as a general PC, and also operates as an authentication program for authenticating the USB device 2 which is a second device, thereby transmitting a predetermined authentication command to the USB device 2, and receiving a response to the predetermined authentication command from the USB device 2. Also, the control unit 11 determines whether the firmware of the USB device 2 is falsified, based on whether the response received from the USB device 2 is a predetermined response, and outputs the determination result. The detailed operations of the control unit 11 will be described below.

The memory unit 12 retains programs which are executable by the control unit 11. The programs which are retained by the memory unit 12 include an authentication program for authenticating the USB device 2. These programs may be programs read from computer-readable non-transitory storage media retaining the corresponding programs and stored in the memory unit 12, and may be programs stored in the memory unit 12 through communication means such as a network. Also, the authentication program may be a program provided together with the USB device 2. Specifically, in an example of the present embodiment, a computer-readable recording medium retaining the authentication program is provided together with the USB device 2. In order to use the USB device 2, a user installs the authentication program stored in the provided recording medium, in the memory unit 12.

In the present embodiment, the memory unit 12 also operates as a work area of the control unit 11. The operation unit 13 is, for example, a mouse, a keyboard, and the like, and receives user's operations, and outputs the contents of the received operations to the control unit 11. The display unit 14 is a display or the like, and displays information according to instructions input from the control unit 11. The communication unit 15 is a network interface, and performs information communication with external devices through a network, according to instructions input from the control unit 11. The interface 16 is a USB port or the like. In an example of the present embodiment, the interface 16 functions as a USB host which is connected to the USB device 2. The interface 16 transmits information such as commands to the USB device 2, according to instructions input from the control unit 11. Also, the interface 16 receives information output from the USB device 2, and outputs the received information to the control unit 11.

The control unit 21 of the USB device 2 is a control IC such as a micro computer, and may include a processor. The control unit 21 operates a program (firmware) stored in the memory unit 22. The control unit 21 of the present embodiment performs a process of implementing the functions of the USB device 2, according to the firmware stored in the memory unit 22. For example, if the USB device 2 is a USB memory, the control unit 21 stores information in the memory unit 22, according to instructions input from the PC 1 which is a host. Also, the control unit 21 reads information stored in the memory unit 22 and outputs the read information to the PC 1, according to instructions input from the PC 1.

Also, in the present embodiment, the control unit 21 also receives commands from the PC 1 which is the first device. In a case where a received command is the predetermined authentication command, the control unit 21 transmits a predetermined response, as a process which is performed according to the firmware, that is, a process of the firmware. The operations of the control unit 21 also will be described below.

The memory unit 22 is a non-volatile rewritable memory device such as a flash memory (capable of retaining stored contents even when not powered). In the present embodiment, the memory unit 22 retains a firmware program which is executable by the control unit 21. This firmware program may be a program read from a computer-readable non-transitory storage medium retaining the corresponding program and stored in the memory unit 22, or may be a program stored in the memory unit 22 through a communication means such as a network.

The interface 23 is a USB port or the like. In an example of the present embodiment, the interface 23 is connected to the interface 16 of the PC 1. The interface 23 receives information such as commands output from the PC 1, and outputs the received information to the control unit 21. Also, the interface 23 transmits information, such as a response to a command, to the PC 1, according to instructions input from the control unit 21.

Figure 2:
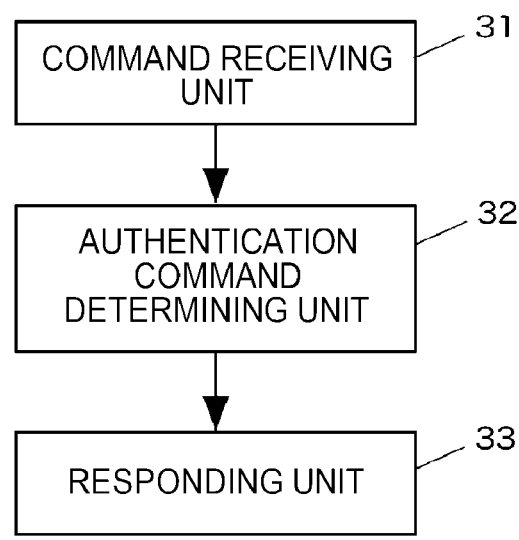
FIG. 2 is a functional block diagram illustrating an example of an information processing apparatus according to the embodiment of the present disclosure.

The control unit 21 of the USB device 2 according to the present embodiment executes the firmware stored in the memory unit 22, thereby functionally including a command receiving unit 31, an authentication command determining unit 32, and a responding unit 33 as illustrated in FIG. 2. In an example of the present embodiment, the command receiving unit 31 receives a command from the PC 1 through the interface 23, and outputs the received command to the authentication command determining unit 32.

The authentication command determining unit 32 determines whether the command received by the command receiving unit 31 is the predetermined authentication command. Specifically, the command which the command receiving unit 31 receives from the PC 1 may be a command of a small computer system interface (SCSI), and the predetermined authentication command may be a command unique to the vendor of the SCSI (a command which the vendor can arbitrarily determine). In a case where the authentication command determining unit 32 determines that the command received from the PC 1 is the predetermined authentication command, the authentication command determining unit 32 instructs the responding unit 33 to make a response.

If receiving the instruction from the authentication command determining unit 32, the responding unit 33 transmits the predetermined response to the PC 1. Specifically, the predetermined response may be predetermined information such as a character string. In this case, the corresponding information such as a character string may be hard-coded in the firmware. If the predetermined information such as a character string is kept as a secret, any firmware falsifier cannot generate a program module for making the predetermined response such as a character string, and thus cannot make the predetermined response even if receiving the predetermined authentication command. Therefore, it is possible to detect falsification of the firmware.

Figure 3:
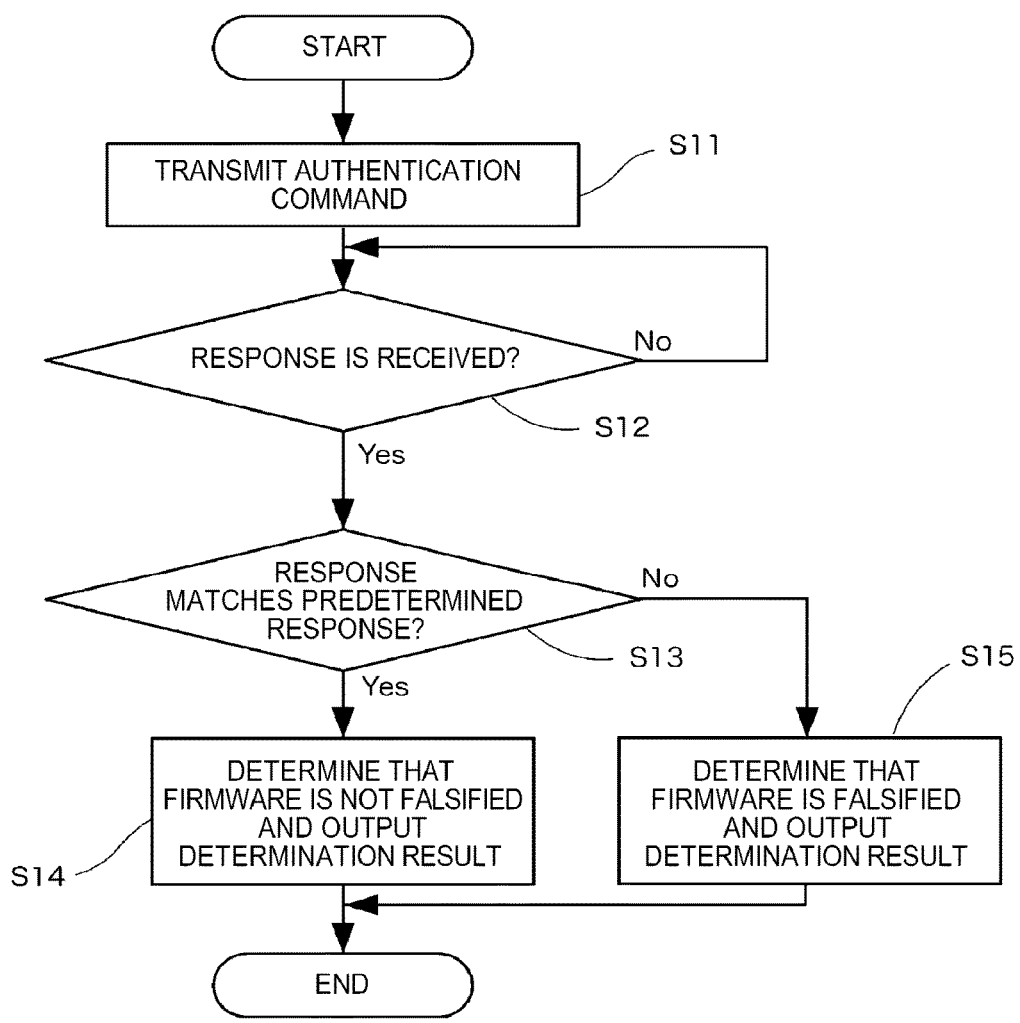
FIG. 3 is a flow chart illustrating operation examples of a first device according to the embodiment of the present disclosure.

In this example, the control unit 11 of the PC 1 which is connected to the USB device 2 starts to execute the authentication program at a predetermined timing such as the timing of connection with the USB device 2. As illustrated in FIG. 3, in STEP S11, the control unit 11 transmits the command unique to the vendor of the SCSI, as the predetermined authentication command, to the USB device 2. Subsequently, in STEP S12, the control unit 11 stands by until a response to the predetermined authentication command is received from the USB device 2. If a response is received from the USB device 2, the control unit 11 determines whether the received response is the predetermined response. As described above, in a case where the received response is the predetermined information such as a character string, it is considered that the memory unit 12 of the PC 1 retains the predetermined information such as a character string (hard-coded, for example, as a part in the authentication program) which the USB device 2 should transmit as a response.

In other words, if a response is received from the USB device 2, in STEP S13, the control unit 11 compares the received response with the information such as a character string retained in the memory unit 12. If both match each other, in STEP S14, the control unit determines that the firmware of the USB device 2 has not been falsified, and outputs the determination result. Meanwhile, when the control unit 11 compares the response received from the USB device 2 with the information such as a character string retained in the memory unit 12 in STEP S13, if both do not match each other, in STEP S15, the control unit determines that the firmware of the USB device 2 is falsified, and outputs the determination result.

In this example (the example in which the information such as a character string which should be a response is hard-coded in the firmware and the authentication program retained in the memory unit 12) of the present embodiment, in a case where the source code of the firmware or the like is exposed to the outside, like a case where the source code is opened by the vendor side, the information such as a character string which should be a response is also published.

For this reason, in a case of using this example of the present embodiment, it is preferable that a program compiler of the firmware or the like should perform a process of deleting a character string designated as information such as a character string which should be a response, from the source code, after compiling. In an example of the present embodiment, the authentication program and the corresponding firmware are generated once and are compiled. In other words, an information processing apparatus for generating the authentication program and the firmware loads the source codes of the authentication program and the firmware, and inserts the information such as a character string which should be a response, at a predetermined position of each of the loaded source codes. Also, the insertion position may be determined so as to be apart from the head of the corresponding source code, or the information such as a character string may be inserted at a position where there is a predetermined instruction character string (such as a pragma) for the compiler. In this case, the information such as a character string may be inserted by a preprocessor of the complier. Also, a character string which should be a response may be randomly issued by the complier (including the preprocessor).

Thereafter, the authentication program and the firmware including the character string are complied, whereby their execution modules are generated. The execution module of the authentication program can be stored, for example, in a computer-readable recording medium. Also, the execution module of the firmware can be written in the memory unit 22 of the USB device 2.

Also, if the compiling is completed, the information processing apparatus for generating the authentication program and the firmware deletes the information such as a character string inserted, as information which should be a response, at the predetermined positions in the source codes of the authentication program and the firmware.

Therefore, in the present embodiment, even if the source codes are exposed to the outside, the information such as a character string which should be a response is not published.

[Other Examples of Authentication Command]

Although the case where the authentication command to be transmitted by the control unit 11 of the PC 1 is a command, such as a command unique to the vendor of the SCSI, especially determined as an authentication command is described above, the present embodiment is not limited thereto. Specifically, in the present embodiment, the authentication command may be an arbitrary command to be transmitted in a predetermined mode. Here, the arbitrary command may a command unique to the vendor, or may be an existing command. Also, the predetermined mode may be a mode in which a command is transmitted a predetermined number of times per unit time. For example, the predetermined mode may be a mode in which a GetDescripter command of the SCSI is transmitted ten times per second. In this case, the predetermined command does not need to be consecutively transmitted. As long as the predetermined command can be transmitted the predetermined number of times per unit time, commands other than the predetermined command may be transmitted between the timings of transmission of the predetermined command. Alternatively, the predetermined mode may be a mode for transmitting commands "A", "B", and "C" in a predetermined order, for example, the order of "A", "B", and "C", within one second.

In this example, while the control unit 21 of the USB device 2 which is the second device operates as the authentication command determining unit 32, if the control unit determines that the command receiving unit 31 has received a command in the predetermined mode, it determines that the predetermined authentication command has received, and instructs the responding unit 33 to make the predetermined response.

In this example, while the control unit 21 operates as the authentication command determining unit 32, if it determines that the command receiving unit 31 has received a command in a mode other than the predetermined mode, the control unit outputs an instruction for performing a process related to the corresponding command. For example, in a case where the predetermined mode is a mode in which the GetDescripter command of the SCSI is transmitted ten times per one second, if the control unit 21 of the USB device 2 receives the GetDescripter command of SCSI from the PC 1 ten times per second, it makes the predetermined response to the PC 1. In this case, it is not required to perform a normal process related to the received command (the GetDescripter command).

However, in a case where the control unit 21 of the USB device 2 receives the GetDescripter command of the SCSI from the PC 1 in a mode other than the mode in which the control unit receives the command ten times per second, for example, a case where the control unit receives the GetDescripter command once within one second, when the GetDescripter command is received, the control unit performs the normal process. As described above, the number of times the predetermined command is received within a unit time is measured, whereby it is possible to determine whether the firmware is falsified. Also, in this case, even if the predetermined command is not consecutively received, since the predetermined command needs only to be received the predetermined number of times per unit time, commands other than the predetermined command may be received between the timing of reception of the predetermined command.

[Other Examples of Response]

Also, the response is not limited to the example in which the predetermined information such as a character string is transmitted. For example, the control unit 11 of the PC 1 of the present embodiment may randomly generate encoding target information such as a character string, and encode the encoding target information generated randomly, and include the encoding target information in an authentication command, and transmit the authentication command.

In the example, while the control unit 21 of the USB device 2 which should make a response to the authentication command performs processing as the responding unit 33, the control unit may decode the information encoded in the PC 1 and included in the authentication command received from the PC 1, by a predetermined method, and transmit the decoding result as a response to the PC 1.

Here, the encoding method is, for example, an encoding method using a predetermined encryption key. Also, decoding which is performed in the control unit 21 of the USB device 2 is performed using a decryption key corresponding to the predetermined encryption key. In this example, the decryption key corresponding to the encryption key is kept as a secret. In this case, since firmware falsifiers cannot create a program module for making a response subjected to the corresponding decoding (a program module for decoding encoded information, even if they receive the predetermined authentication command, the predetermined response cannot be made. Therefore, it is possible to detect falsification of the firmware. In this example of the present embodiment, each of the control unit 11 of the PC 1 and the control unit 21 of the USB device 2 operates as follows.

Figure 4:
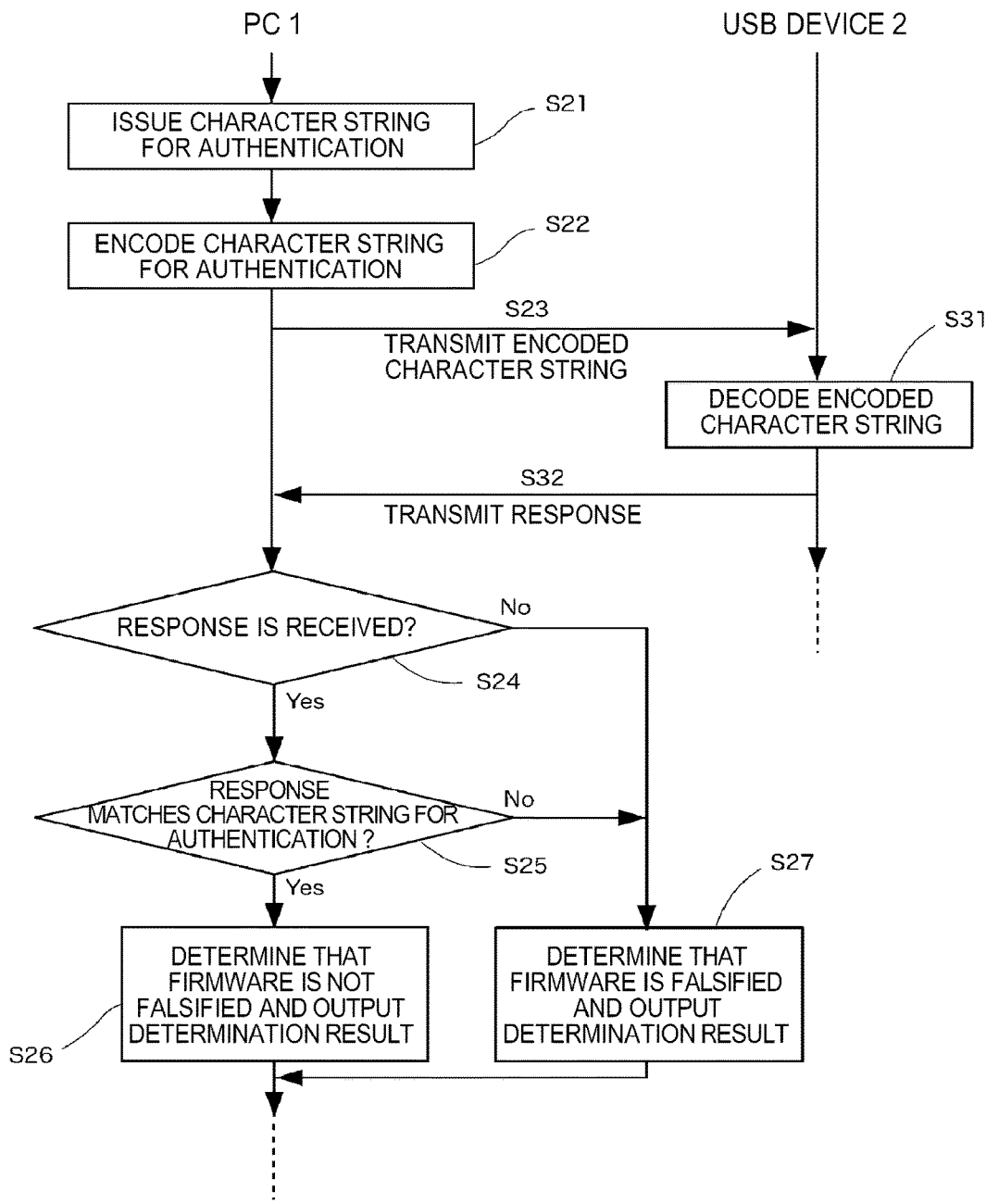
FIG. 4 is a flow chart illustrating other operation examples of the first device according to the embodiment of the present disclosure.

Specifically, the control unit 11 starts to execute the authentication program at a predetermined timing such as the timing of connection with the USB device 2. Then, as illustrated in FIG. 4, in STEP S21, the control unit 11 issues a character string for authentication, as encoding target information, for example, in a random manner. Subsequently, in STEP S22, the control unit 11 encodes the issued character string using the predetermined encryption key, thereby obtaining an encoded character string. Subsequently, in STEP S23, the control unit 11 transmits a command including the encoded character string, as the predetermined authentication command, to the USB device 2 which is the second device.

If the control unit 21 of the USB device 2 receives the predetermined authentication command, in STEP S31, the control unit 21 extracts the encoded character string from the authentication command, and decodes the encoded character string using the predetermined decryption key. Subsequently, in STEP S32, the control unit 21 transmits the decoding result, as a response to the authentication command, to the PC 1.

In STEP S24, the control unit 11 of the PC 1 determines whether a response to the predetermined authentication command has received from the USB device 2 within a predetermined timeout time. If it is determined that a response has received within the predetermined timeout time ("Yes" in STEP S24), in STEP S25, the control unit 11 determines whether the received response matches the character string for authentication issued in the process of STEP S21.

If it is determined in STEP S25 that the response acquired from the USB device 2 matches the character string for authentication issued in the process of STEP S21 ("Yes" in STEP S25), in STEP S26, the control unit 11 determines that the firmware of the USB device 2 has not been falsified, and outputs the determination result. Meanwhile, if it is determined in STEP S25 that the response acquired from the USB device 2 does not match the character string for authentication issued in the process of STEP S21 ("No" in STEP S25), in STEP S27, the control unit 11 determines that the firmware of the USB device 2 is falsified, and outputs the determination result.

Meanwhile, in a case where it is determined in STEP S24 that a response to the predetermined authentication command has not been received from the USB device 2 within the predetermined timeout time ("No" in STEP S24), the control unit 11 proceeds to the process of STEP S27, and keeps processing.

Also, even in this example, the encryption key, the decryption key corresponding to the encryption key may be hard-coded in the authentication program of the PC 1 and the firmware of the USB device 2.

Further, even in this case, it is preferable that the program compiler of the firmware and the like should perform a process of deleting the encryption key and the decryption key from the source codes. In an example of the present embodiment, the authentication program and the firmware corresponding to the authentication program are generated and complied once. In other words, the information processing apparatus for generating the authentication program and the firmware loads the source codes of the authentication program and the firmware, and inserts the information such as the encryption key at predetermined positions in the loaded individual source codes (in a case of using the decryption key, the information processing apparatus inserts the decryption key into the authentication program, and inserts a corresponding encryption key in the firmware). Also, each insertion position may be determined so as to be apart from the head of a corresponding source code, or the information such as the encryption key may be inserted at a position of a predetermined instruction character string (such as a pragma) for the compiler. In this case, the corresponding information may be inserted by the processor of the compiler. Also, the information such as the encryption key may be issued by the compiler (including the preprocessor).

Thereafter, the authentication program and the firmware including the information such as the encryption key are compiled, whereby their execution modules are generated. The execution module of the authentication program can be stored, for example, in a computer-readable recording medium. Also, the execution module of the firmware can be written in the memory unit 22 of the USB device 2.

Also, if compiling is completed, the information processing apparatus for generating the authentication program and the firmware deletes the information such as the encryption key inserted at the predetermined positions in the source codes of the authentication program and the firmware.

Therefore, in the present embodiment, even if the source codes are exposed to the outside, the information such as the encryption key is not published with the source codes.

[Other Examples of First and Second Devices]

Although the example in which the first device is the PC and the second device is the USB device which is connected to the PC is described above, the present embodiment is not limited thereto.

Figure 5:
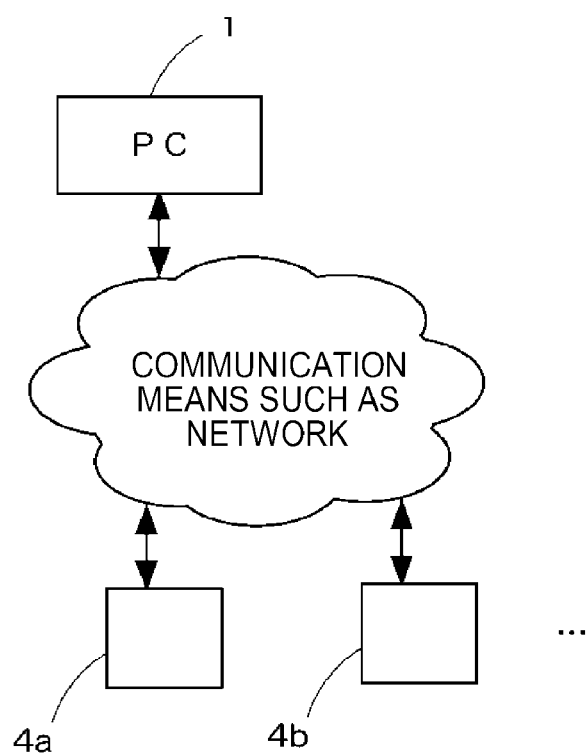
FIG. 5 is a component block diagram illustrating another example of the information processing system according to the embodiment of the present disclosure.

For example, in an example of the present embodiment, as illustrated in FIG. 5, a first device may be a PC 1 having a wireless or wired LAN interface, and second devices may be wireless LAN access point devices 4a, 4b, . . . . In this example of the present embodiment, the PC 1 operates as a management device of the plurality of wireless LAN access point devices 4a, 4b, . . . (each of the wireless LAN access point devices 4a, 4b, . . . will be hereinafter referred to simply as a wireless LAN access point device 4 in a case where it is unnecessary to distinguish the wireless LAN access point devices 4a, 4b, . . . from one another), and manages the settings of the wireless LAN access point devices 4.

In this example of the present embodiment, a wireless LAN access point device 4 is connected to the PC 1 wirelessly or through a wired LAN, and receives commands from the PC 1 by wireless or wired communication. Also, firmware is installed in the wireless LAN access point device 4, and a CPU of the wireless LAN access point device serves as a control unit and operates according to the firmware as follows.

In other words, the wireless LAN access point device 4 determines whether a command received from the PC 1 operating the management device is the predetermined authentication command. If it is determined that the command received from the PC 1 is the predetermined authentication command, the wireless LAN access point device 4 transmits a predetermined response to the PC 1. This response may be predetermined information such as a character string included in the firmware installed in advance in the wireless LAN access point device 4, like the response described in the example of the USB device 2, or may be information obtained by encoding information such as a character string included in the command received from the PC 1 by a predetermined method.

Similarly in the example shown in FIG. 3, the PC 1 executes the authentication program at a specified timing (such as the timing of activation or a predetermined timing), thereby transmitting the predetermined authentication command to each of the wireless LAN access point devices 4a, 4b, . . . which are the second devices, in STEP S11.

Then, the PC 1 stands by until the PC receives a response to the predetermined authentication command from each of the wireless LAN access point devices 4a, 4b, . . . ("No" in STEP S12). Whenever a response is received from any of the wireless LAN access point devices 4a, 4b, ("Yes" in STEP S12), in STEP S13, with respect to the wireless LAN access point device 4 having transmitted the corresponding response, the PC 1 determines whether the response received from the corresponding wireless LAN access point device 4 is the predetermined response.

If a response received from a wireless LAN access point device 4 is the predetermined response ("Yes" in STEP S13), in STEP S14, the PC 1 determines that the firmware of the corresponding wireless LAN access point device 4 has not been falsified, and outputs the determination result. Meanwhile, in a case where a response received from a wireless LAN access point device 4 is not the predetermined response ("No" in STEP S13), in STEP S15, the control unit 11 determines that the firmware of the corresponding wireless LAN access point device 4 is falsified, and outputs the determination result.

Also, in this case where the wireless LAN access point devices 4 are the second devices, the authentication command may be a command for inquiring about information of the wireless LAN access point devices 4 such as device types, MAC addresses, or functions. In this case, the PC 1 is configured so as to retain responses of the wireless LAN access point devices 4 to the above described inquiry, in advance. For example, the PC is configured so as to retain information or the like representing the device types of the wireless LAN access point devices 4, as information specifying the wireless LAN access point devices 4, in association with the MAC addresses of the wireless LAN access point devices 4, respectively.

In this case, whenever the PC 1 receives a response transmitted with respect to the inquiry which is the authentication command by any of the wireless LAN access point devices 4 ("Yes" in STEP S12), in STEP S13, the PC examines whether the response matches information or the like, representing a device type, stored in association with a MAC address which is the transmission source of the response. If they match each other ("Yes" in STEP S13), in STEP S14, the PC determines that the firmware of the corresponding wireless LAN access point device 4 has not been falsified, and outputs the determination result. Meanwhile, if the response received from the corresponding transmission source does not match the information or the like, representing the device type, stored in association with the MAC address which is the transmission source of the response ("No" in STEP S13), in STEP S15, the PC determines that the firmware of the corresponding wireless LAN access point device 4 is falsified, and outputs the determination result.

Also, in a case where the settings of the second devices can be changed from the outside, the first device may be configured so as to transmit the authentication command as follows. In other words, in an example of the present embodiment, each wireless LAN access point device 4 which is a second device functions as a WEB server, and has a function of receiving a change of the operation settings of the corresponding WEB server through a WEB page which is distributed by the corresponding WEB server.

In this case, the PC 1 which is the first device accesses the WEB page which is distributed by the corresponding wireless LAN access point device, thereby performing a predetermined setting change. Specifically, the PC 1 attempts a predetermined setting change such as writing of a character string or a switching between operating modes. In this example, an instruction for the corresponding setting change corresponds to the authentication command of the operation of STEP S11 shown in FIG. 3. In other words, in STEP S11, the PC 1 transmits a setting change instruction as the authentication command.

After a corresponding setting change, the PC 1 re-accesses the WEB page which is distributed by the corresponding wireless LAN access point device 4. Then, the PC 1 stands by until the wireless LAN access point device 4 responses to the corresponding access ("No" in STEP S12). If the PC receives information representing that the setting change is normally performed, as a response to the authentication command ("Yes" in STEP S12), the PC proceeds to the process of STEP S13. In a case where it is determined in STEP S13 that the PC has received information representing that the setting change is normally performed (in this example, the information representing that the setting change is normally performed corresponds to the predetermined response) ("Yes" in STEP S13), in STEP S14, the PC 1 determines that the firmware of the corresponding wireless LAN access point device 4 has not been falsified, and outputs the determination result.

Meanwhile, in a case where it is determined in STEP S13 that the PC has received information representing that the setting change has not been normally performed (such as a case where the setting change has not been performed) ("No" in STEP S13), in STEP S15, the PC 1 determines that the firmware of the corresponding wireless LAN access point device 4 is falsified, and outputs the determination result.

[Another Example of Response Transmitting Method]

Also, although the example in which the wireless LAN access point devices 4 which are the second devices transmit their responses directly to the first device is described above, each wireless LAN access point device may access a server specified by a preset URL, and transmit a response to the corresponding server, thereby performing response transmission. This server is a log server such as a syslog server, and with reference to the response of the corresponding wireless LAN access point device 4 recorded in the corresponding log server, the first device examines whether the corresponding response is the predetermined response, thereby detecting whether the firmware of the corresponding wireless LAN access point device 4 is falsified.

Example in which Wireless LAN Access Point Devices Mutually Confirm Response

Also, in this example of the present embodiment, each wireless LAN access point device 4 may be a first device. For example, in an example of the present embodiment, each wireless LAN access point device 4 serves not only as a first device but also as a second device. In this example, in a case where the wireless LAN access point device 4a functions as a first device, another wireless LAN access point device 4b servers as a second device, and the wireless LAN access point device 4a transmits the predetermined authentication command to the wireless LAN access point device 4b, wireless or through a wired LAN. Then, the wireless LAN access point device 4b offers a response wireless or through the wired LAN. Based on whether the corresponding response is the predetermined response, the wireless LAN access point device 4a detects whether the firmware of the wireless LAN access point device 4b is falsified.

The transmission of the authentication command may be set to be performed at each of predetermined timings (whenever a predetermined timing comes, for example, at fixed time intervals). In this case, the wireless LAN access point devices 4 synchronize their internal times with one another, using a network time protocol (NTP) server or the like accessible through a network, in advance. Then, whenever a predetermined timing comes, the wireless LAN access point device 4a starts to operate as a first device, and transmits the authentication command to the other wireless LAN access point devices 4b, 4c, . . . operating as second devices.

In this case, if any of the wireless LAN access point devices 4b, 4c, . . . does not offer the predetermined response, or does not offer any response, with respect to the corresponding wireless LAN access point device 4, the wireless LAN access point device 4a determines that the firmware of the wireless LAN access point device is falsified, and outputs information representing the determination result (for example, the wireless LAN access point device 4a writes the corresponding information in the syslog server such that an administrator can refer to the corresponding information with a PC or the like).

Also, in a case where the wireless LAN access point device 4a operating as the first device does not transmit the authentication command even if a predetermined time (for example, one minute) elapses after the predetermined timing, the other wireless LAN access point devices 4b, 4c, . . . operating as the second devices may determine that the firmware of the wireless LAN access point device 4a is falsified, and output information representing their determination results (for example, they write the corresponding information in the syslog server such that the administrator can refer to the corresponding information with a PC or the like). As described above, in an example of the present embodiment, the wireless LAN access point devices can perform authentication on one another.

Example Using Beacon

Also, in each example described above, a wireless LAN access point device 4 functioning as a first device may include the authentication command in a portion (an area such as an information element area) of a beacon (ESSID broadcast) packet which is a type of management packet defined in the 802.11 standards of IEEE, and transmit the beacon packet.

In this example of the present embodiment, a second device (a wireless LAN access point device 4) is a so-called wireless LAN relay device, and relays wireless LAN communication between the wireless LAN access point device which is the first device and wireless LAN station devices which are wireless LAN terminal devices. In other words, in this example, the second device functions as a wireless LAN station device with respect to the wireless LAN access point device which is the first device, and functions as a wireless LAN access point device with respect to other wireless LAN terminal devices.

In this case, the wireless LAN access point device 4 functioning as the second device has a wireless LAN station function, and receives the beacon packet broadcasted by the wireless LAN access point device 4 functioning as the first device, by using the wireless LAN station function. The wireless LAN access point device 4 examines whether the received beacon packet includes the authentication command, and transmits the predetermined response to the first device if the authentication command is included.

Also, in this example, while the wireless LAN access point device 4 functioning as the second device operates as a wireless LAN station function, if it transmits the corresponding response, it may include the response in a portion (an area such as an information element area) of a wireless LAN probe request packet which is a type of management packet defined in the 802.11 standards of IEEE, and transmit the wireless LAN probe request packet to the first device.

After the wireless LAN access point device 4 functioning the first device transmits the authentication command (the beacon packet including the authentication command), if it receives a probe request packet, as a response, from another wireless LAN access point devices 4 functioning as a second device and having received the beacon packet, it examines whether the corresponding probe request packet includes a response. Also, after the wireless LAN access point device 4 functioning as the first device transmits the authentication command, if a probe request packet including no response is received from another wireless LAN access point device 4 functioning as a second device before the authentication command is transmitted a predetermined number of times or a predetermined time elapses, the wireless LAN access point device 4 functioning as the first device determines that the firmware of the corresponding wireless LAN access point device 4 functioning as a second device is falsified, and outputs information representing the determination result.

Meanwhile, after the wireless LAN access point device 4 functioning as the first device transmits the authentication command, if a probe request packet including a response is received from another wireless LAN access point device 4 functioning as a second device, the wireless LAN access point device 4 functioning as the first device examines whether the received response matches the predetermined response. If they match each other, the wireless LAN access point device 4 functioning as the first device determines that the firmware of the wireless LAN access point device 4 functioning as a second device and having offered the corresponding response has not been falsified, and outputs information representing the determination result. Also, in this case, after the wireless LAN access point device 4 functioning as the first device transmits the authentication command, if a probe request packet is received from another wireless LAN access point devices 4, and the probe request packet does not include the predetermined response, or includes a response different from the predetermined response, the wireless LAN access point device 4 functioning as the first device determines that the firmware of the wireless LAN access point device 4 having offered the corresponding response is falsified, and outputs information representing the determination result.

Example Using Dongle

Also, in an example of the present embodiment, the authentication program may be stored in external storage devices such as a USB memory device to be provided. In this example, devices such as the wireless LAN access point devices 4 capable of functioning as second devices (in other words, devices having reliable firmware including a program module for operating as a second device) have interfaces for receiving those external storage devices.

In this case, if an external storage device retaining the authentication program is connected to the interface of a wireless LAN access point device 4, the corresponding wireless LAN access point device starts to execute the corresponding authentication program, and transmits the authentication command to itself. The authentication command may be transmitted, for example, to the local loopback address.

The corresponding wireless LAN access point device 4 receives the authentication command transmitted to itself, and performs a firmware process of generating and transmitting a predetermined response (in this case, similarly, the predetermined response is transmitted to the corresponding wireless LAN access point device, that is, the local loopback address).

When the wireless LAN access point device 4 operates as the authentication program, it examines whether the response transmitted from itself matches the predetermined response. If they match each other, the corresponding wireless LAN access point device 4 determines that its firmware has not been falsified, and outputs information representing the determination result. Meanwhile, if the response transmitted from itself does not match the predetermined response, the corresponding wireless LAN access point device 4 determines that its firm is falsified, and outputs information representing the determination result.

[Other Examples of First and Second Devices]

Also, the first and second devices are not limited to the wireless LAN access point devices 4, and may be network devices such as a network attached storage (NAS), routers, and other devices. According to the present embodiment, it is possible to detect unauthorized rewriting of the firmware of various devices.

[Example of Updating of Firmware]

Also, in an example of the present embodiment, when the PC 1 which is the first device updates the firmware of a second device such as the USB device 2, the second device may authenticate the first device, and allow updating. In this example, if the control unit 11 of the PC 1 receives an instruction for updating the firmware of a second device (hereinafter, a case where the second device is the USB device 2 will be described as an example) (an instruction for executing a program for updating firmware) from a user, the control unit performs the following process.

Figure 6:
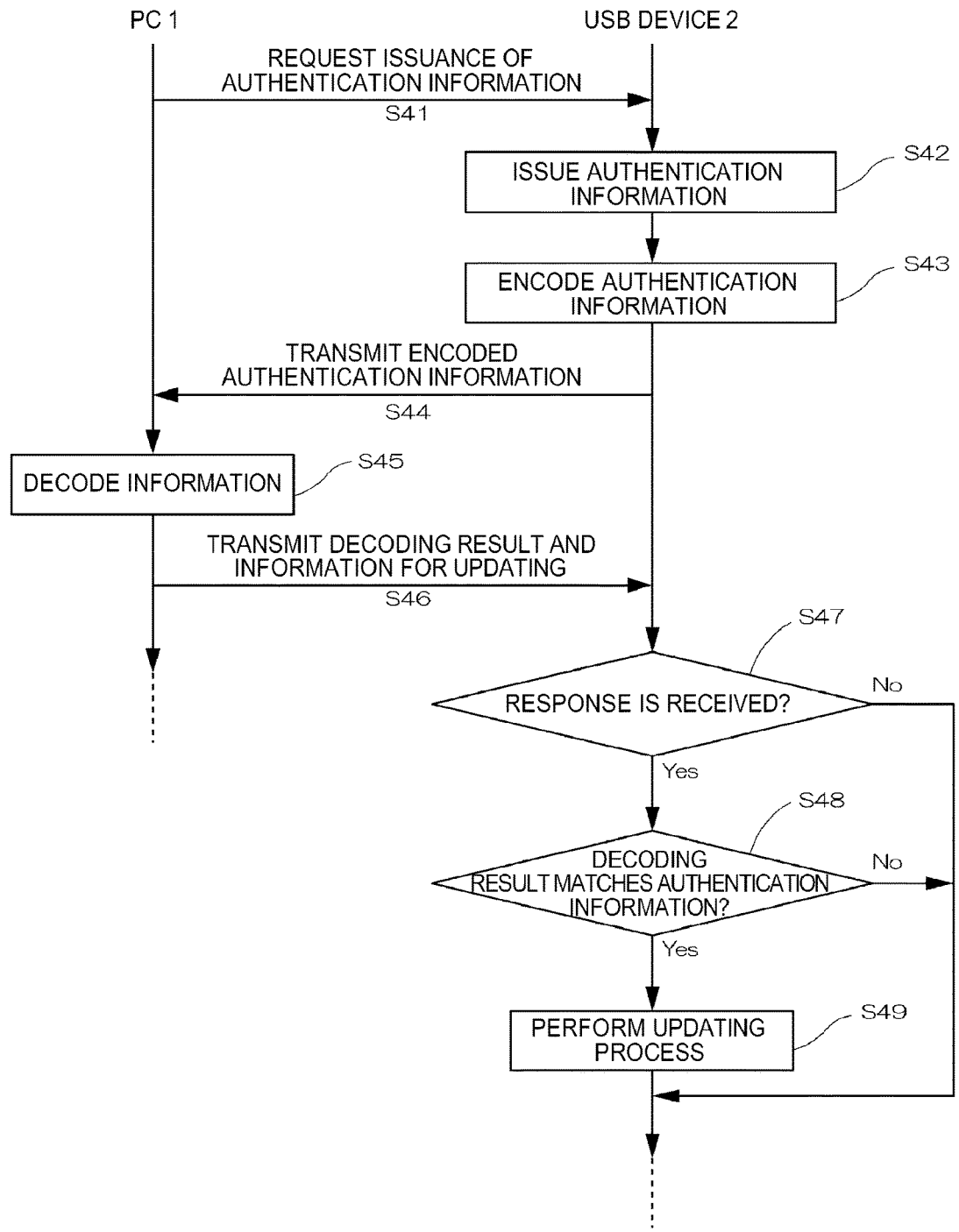
FIG. 6 is a flow chart illustrating operation examples of a second device during firmware updating according to the embodiment of the present disclosure.

Specifically, as illustrated in FIG. 6, in STEP S41, the control unit 11 requests the USB device 2 to issue authentication information. If the control unit 21 of the USB device 2 receives the authentication information issuance request, in STEP S42, it issues a character string, as authentication information, for example, randomly. Subsequently, in STEP S43, the control unit 21 encodes the character string issued as authentication information, using a predetermined encryption key, thereby obtaining an encoded character string. Subsequently, in STEP S44, the control unit 21 transmits the encoded character string to the PC 1.

If the control unit 11 of the PC 1 receives the encoded character string transmitted from the USB device 2, in STEP S45, it decodes the encoded character string, using a predetermined decryption key. Subsequently, in STEP S46, the control unit 11 transmits the decoding result and firmware data for updating, to the USB device 2. If decoding of STEP S45 was not correctly performed, the decoding result which is received in STEP S46 by the USB device 2 does not match the authentication information.

In STEP S47, the control unit 21 of the USB device 2 determines whether a response including the decoding result is received from the PC 1 within a predetermined timeout time. If it is determined that a response is received ("Yes" in STEP S47), in STEP S48, the control unit 21 determines whether the received decoding result matches the character string issued as the authentication information in STEP S42.

If it is determined in STEP S48 that the decoding result acquired from the PC 1 matches the character string issued as authentication information in STEP S42 ("Yes" in STEP S48), the control unit 21 performs a process of updating the firmware stored in the memory unit 24, with the firmware data for updating received together with the decoding result, in STEP S49, and finishes the process.

Meanwhile, if it is determined in STEP S48 that the decoding result acquired from the PC 1 does not match the character string issued as authentication information in STEP S42 ("No" in STEP S48), the control unit 21 discards the information received from the PC 1, and finishes the process.

Even in this example, information such as the encryption key and the corresponding decryption key may be hard-coded in the firmware of the USB device 2 and the firmware updating program of the PC 1.

Also, even in this case, it is preferable that the program compiler of the firmware and the like should perform a process of deleting the information such as the encryption key and the decryption key from the source codes, after compiling. In an example of the present embodiment, the firmware updating program and firmware corresponding to the firmware updating program (firmware to be an update target of the firmware updating program) are generated and complied once. In other words, the information processing apparatus for generating the firmware updating program and the firmware loads the source codes of the firmware updating program and the firmware, and inserts information such as the encryption key at predetermined positions in the loaded individual source codes (in a case of using the decryption key, the information processing apparatus inserts the decryption key in the firmware updating program, and inserts the encryption key in the firmware). Also, each insertion position may be determined so as to be apart from the head of a corresponding source code, or the information such as the encryption key may be inserted at a position of a predetermined instruction character string (such as a pragma) for the compiler. In this case, the corresponding information may be inserted by the processor of the compiler. Also, the information such as the encryption key may be issued by the compiler (including the preprocessor).

Thereafter, the firmware including the information such as the encryption key is complied, whereby its execution module is generated. Also, the firmware updating program including the decryption key is complied when the updating program is created, whereby its execution module is generated. The execution module of the firmware updating program can distributed, for example, via computer-readable recording mediums retaining the execution module, or through networks. Also, the execution module of the firmware can be written in the memory unit 22 of the USB device 2.

Also, if compiling is completed, the information processing apparatus for generating the firmware updating program and the firmware deletes the information such as the encryption key inserted at the predetermined positions in the source codes of the firmware updating program and the firmware.

According to this example of the present embodiment, it is possible to prevent a firmware updating program from being created in an unauthorized manner and prevent the firmware of a second device such as the USB device 2 from being rewritten in an unauthorized manner.

In other words, in the present embodiment, the second device may be configured as follows. A second device includes: a unit that receives an authentication information request, issues authentication information, decodes the authentication information with a predetermined encryption key, and transmits the encoded information to the source of the authentication information request; and a unit that receives a decoding result obtained by decoding the encoded information and firmware update information, from the source of the authentication information request, and updates its own firmware with the update information received together with the decoding result if the decoding result matches the authentication information issued previously.

Also, the first device may examine whether the firmware of a second device is falsified, during activation of the firmware updating program, for example, by the method described above with reference to FIG. 3 or 4. In this case, if it is determined that the firmware has not been falsified, the first device may output an authentication information request to the second device. In this example, if it is determined that the firmware of the second device is falsified, the first device finishes the process without performing the subsequent process (the process shown in FIG. 6).

Also, even with respect to embodiments of firmware updating, the above-described individual examples can be used. For example, although the case where a first device is the PC and a second device is the USB device which is connected to the PC is described, a first device may be a PC 1 having a wireless or wired LAN interface, and second devices may be wireless LAN access point devices 4a, 4b, . . . . Further, the first and second devices may be network devices such as a network attached storage (NAS), routers, and other devices. Furthermore, for example, a second device may be a device which transmits a response directly to the first device, or may access a server specified by a predetermined URL, and transmit a response to the server, thereby performing response transmission.

In the meantime, part or all of the configuration of the disclosure may be implemented by hardware. The hardware may be, for example, an integrated circuit, a discrete circuit or a module provided by combining these circuits.

The invention claimed is:

1. An information processing system, comprising:
 a first device, the first device being a USB host device; and
 a second device, the second device being a USB device, wherein
 the first device includes first circuitry configured to:
  transmit a predetermined authentication command, including an instruction for issuing authentication information, to the second device, the predetermined authentication command being a command of a small computer system interface (SCSI) format that is unique to a vendor of the SCSI,
  receive a response to the predetermined authentication command from the second device, and
  determine whether firmware of the second device is falsified based on whether the response received from the second device is a predetermined response and output a determination result, the predetermined authentication command including encoded authentication information,
 the second device includes second circuitry configured to:
  retain firmware and perform processing based on the firmware,
  receive a command from the first device,
  determine whether the received command is the predetermined authentication command as a processing of the firmware and, in response to determining that the received command is the predetermined authentication command,
  transmit the predetermined response to the first device as the processing of the firmware, and
  transmit decoded authentication information, obtained by decoding the encoded authentication information, to the first device, as the processing of the firmware, wherein
  in response to receiving the decoded authentication information from the second device, the first circuitry determines whether the firmware of the second device is falsified based on the received decoded authentication information and outputs the determination result.

2. The information processing system according to claim 1, wherein the encoded authentication information includes an encoded random character string obtained by generating and encoding a random character string in the first device, the second circuitry is configured to transmit decoded random character string obtained by decoding the encoded random character string as processing of the firmware, and when the first circuitry receives the decoded random character string from the second device, the first circuitry compares the received decoded random character string with the random character string generated in the first device to determine whether the firmware of the second device is falsified based on the comparison result and outputs the determination result.

3. The information processing system according to claim 1, wherein
after compiling of the firmware, the second circuitry deletes the decoded authentication information.

4. The information processing system according to claim 1, wherein
the predetermined authentication command includes a GetDescripter command.

5. An information processing apparatus, the information processing apparatus being a USB device, comprising circuitry configured to:
retain firmware and perform processing based on the firmware,
receive a command from an external device, the external device being a USB host device, and
determine whether the received command is a predetermined authentication command, the predetermined authentication command being a command of a small computer system interface (SCSI) format that is unique to a vendor of the SCSI, wherein when it is determined that the received command is the predetermined authentication command, the circuitry is further configured to:
transmit a predetermined response to the external device as a processing of the firmware, the predetermined authentication command including encoded authentication information, and
transmit decoded authentication information, obtained by decoding the encoded authentication information, to the external device, as the processing of the firmware, for determining whether the firmware of the circuitry of the information processing apparatus is falsified, wherein
the predetermined authentication command includes an instruction for issuing authentication information, and
when the received command is the predetermined authentication command, the circuitry is further configured to:
transmit first authentication information issued by the information processing apparatus to the external device,
receive second authentication information from the external device as a response to the transmitted first authentication information,
compare the first authentication information issued by the information processing apparatus with the received second authentication information to determine whether updating of the firmware is permitted based on a comparison result, and
update the firmware in response to determining that updating of the firmware is permitted.

6. The information processing apparatus according to claim 5,
wherein
when the circuitry receives a predetermined command from the external device a predetermined number of times per unit time, the circuitry transmits the predetermined response to the external device as processing of the firmware while determining that the received command is the predetermined authentication command.

7. The information processing apparatus according to claim 5, wherein
the predetermined response includes information obtained by encoding information included in the predetermined authentication command received from the external device.

8. The information processing apparatus according to claim 7, wherein
the encoding is performed using a predetermined encryption key.

9. The information processing apparatus according to claim 5,
wherein
the encoded authentication information includes an encoded random character string obtained by generating and encoding a random character string in the external device.

10. The information processing apparatus according to claim 5, wherein
the circuitry is configured to receive update data of the firmware together with the second authentication information from the external device,
when the circuitry determines that updating is permitted, the information processing apparatus updates the firmware using the update data, and
when the circuitry determines that updating is not permitted, the information processing apparatus does not update the firmware.

11. The information processing apparatus according to claim 5, wherein
the predetermined authentication command includes an instruction for issuing authentication information,
when the received command is the predetermined authentication command, the circuitry transmits encoded authentication information obtained by issuing and encoding authentication information in the information processing apparatus, to the external device,
the circuitry is further configured to receive decoded authentication information from the external device, and
the circuitry is configured to compare the authentication information issued in the information processing apparatus with the received decoded authentication information to determine whether updating of the firmware is permitted based on a comparison result.

12. The information processing apparatus according to claim 11, wherein
the encoded authentication information includes an encoded random character string obtained by generating and encoding a random character string in the information processing apparatus.

13. The information processing apparatus according to claim 11, wherein
the circuitry is configured to receive update data of the firmware together with the decoded authentication information from the external device, when the circuitry determines that updating is permitted, the information processing apparatus updates the firmware using the update data, and when the circuitry determines that updating is not permitted, the information processing apparatus does not update the firmware.

14. The information processing apparatus according to claim 5, wherein after compiling of the firmware, the circuitry deletes the decoded authentication information.

15. The information processing apparatus according to claim 5, wherein the predetermined authentication command includes a GetDescripter command.

16. A non-transitory computer readable medium including stored sequences of instructions for authenticating a firmware of a circuitry of an information processing apparatus and for updating the information processing apparatus, the instructions being accessible to a processor and, when executed by the processor, cause the processor to perform a method, the method comprising:

retaining firmware and perform processing based on the firmware;

receiving a command from an external device, the external device being a USB host device;

determining whether the received command is a predetermined authentication command, the predetermined authentication command being a command of a small computer system interface (SCSI) format that is unique to a vendor of the SCSI, wherein in response to determining that the received command is the predetermined authentication command;

transmitting a predetermined response to the external device as a processing of the firmware, the predetermined authentication command including encoded authentication information;

transmitting decoded authentication information, obtained by decoding the encoded authentication information, to the external device, as the processing of the firmware, for determining whether the firmware of the circuitry of the information processing apparatus is falsified, the information processing apparatus being a USB device, wherein the predetermined authentication command includes an instruction for issuing authentication information, and, when the received command is the predetermined authentication command, transmitting first authentication information issued by the information processing apparatus to the external device;

the method further comprising:

receiving second authentication information from the external device as a response to the transmitted first authentication information;

comparing the first authentication information issued by the information processing apparatus with the received second authentication information to determine whether updating of the firmware is permitted based on a comparison result; and updating the firmware in response to determining that updating of the firmware is permitted.

* * * * *